Figures 1, 2, 3:
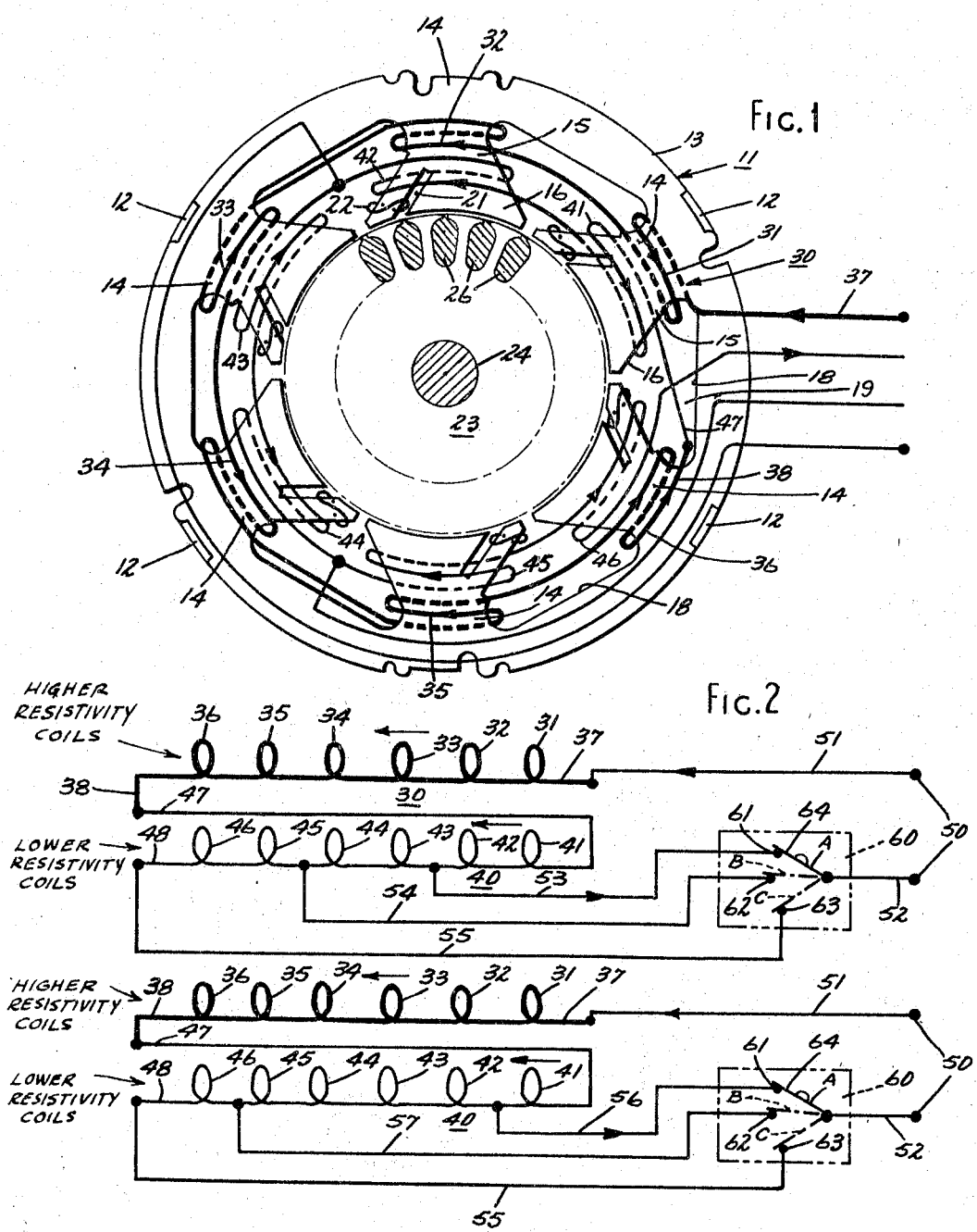

June 6, 1967 — E. D. STAUFFER — 3,324,371

MULTI-SPEED ELECTRIC MOTOR

Filed Jan. 11, 1965

INVENTOR.
EARL D. STAUFFER
BY John M. Stoudt
ATTORNEY.

United States Patent Office 3,324,371
Patented June 6, 1967

3,324,371
MULTI-SPEED ELECTRIC MOTOR
Earl D. Stauffer, Fort Wayne, Ind., assignor to General Electric Company, a corporation of New York
Filed Jan. 11, 1965, Ser. No. 424,601
6 Claims. (Cl. 318—225)

My invention relates generally to alternating current multi-speed induction motors and, more particularly, to single phase shaded pole electric motors which are capable of operating at two or more speeds.

More and more single phase induction motor applications require a motor which is capable of operating at multi-speeds, that is, two or more speeds. In the past, it has been difficult to produce motors which meet this requirement and still retain economy in their manufacture since the motors normally include a separate winding for each speed of operation. It would be extremely desirable, especially for those applications where cost rather than performance is a principal consideration, to provide multi-speed operation by the inherently inexpensive shaded pole type of motor which is generally characterized by relatively low output. This motor normally incorporates a stator member formed with a number of salient poles accommodating coils of a main field winding and so-called shading coils for starting purposes.

The main field winding, energized under both starting and running conditions, is conventionally of the concentrated type; that is, one coil is accommodated on each salient pole of the stator, and is usually wound of a preselected large number of insulated electrically conductive wire turns. In view of the high electrical conductivity property or conversely, the low resistivity of copper, this is the conductor material normally used as the electrically conductive wire for the main winding. Generally speaking, the lower the resistivity (the numerical reciprocal of conductivity and a measure of the ability of the material to conduct electricity) for the conductor material, the more desirable is its use for the main windings of a motor. A typical value of resistivity for copper wire material is 1.724 microhms per centimenter cube at 20 degrees centigrade. By comparison, aluminum wire material typically has a resistivity of 2.828. Consequently, shaded pole motors having six or more salient poles include a main field winding with a relatively low resistivity like copper since the space available for accommodating the coil sides of the winding is quite restricted and at a premium.

It is, therefore, particularly desirable, for reasons of economy, to furnish a shaded pole motor capable of satisfactory multi-speed operation which utilizes at least one main winding wound of electrically conductive material having a unit price less than that for copper, such as aluminum, without greatly affecting the ultimate output of the motor for a given size. However, since aluminum has a higher resistivity than that of copper, its satisfactory use from the standpoint of performance in a shaded pole motor is extremely difficult to achieve, especially for those multi-speed motors having six or more salient poles.

Accordingly, it is the primary objective of this invention to provide an improved electrical motor capable of operating at two or more speeds which is economical to build.

It is a further object of the invention to provide a new and improved, yet low in cost, winding arrangement and circuitry for a multi-speed shaded pole motor.

It is still a further object of the present invention to provide an improved shaded pole stator capable of satisfactory operation at two or more speeds which not only has at least one winding formed of aluminum material but in addition, is still capable of providing a satisfactory output at each speed of operation and is versatile in selectively furnishing any one of several desired speeds.

In carrying out the objects of my invention in one form, I provide a single phase shaded pole induction electric motor with a stator member having a new and improved winding arrangement for selectively operating the motor at two or more speeds. The stator includes a magnetic core formed with a yoke section and a plurality of angularly spaced apart salient pole sections which project inwardly from the yoke section to define a rotor receiving bore. A first electrical coil means, formed of electrically conductive material, has a plurality of turns carried by at least some of the salient pole sections. At least one of the same salient pole sections. At least one of the same salient pole sections accommodating turns of the first electrical coil means also carry a plurality of turns of a second coil means. The stator additionally is provided with a third electrical coil means having a plurality of turns carried by at least one salient pole section other than the at least one pole section accommodating turns of the second electrical coil means. In order to produce the highest operating speed under running conditions for the multi-speed motor under consideration, the first and second electrical coil means are selectively connected in circuit for concurrent energization. A second speed of operation, lower than the highest speed, is attained by selectively connecting all three coil means in circuit for concurrent energization.

A third and still lower speed may be furnished by including a fourth electrical coil means on the stator, with a plurality of turns being carried by preselected pole sections other than those having turns of the second and third coil means, and with all of the coil means being concurrently energized.

This construction permits the use of a material having a different resistivity; e.g., a higher resistivity material, for at least the first coil means from that for the remaining coil means. In spite of this, unusually good output for the motor under each of the various operating speeds is still achieved.

With this arrangement, it is thus possible to furnish a low cost, multi-speed, salient pole motor which can satisfactorily incorporate inexpensive aluminum wire material for one of the electrical coil means without unduly affecting the output of the motor at each speed of operation while permitting economy in the installation of the coil turns on the core. In addition, among other benefits, by the present invention, the individual motor speeds may be easily attained by simple selection of the number of turns for the coils of the electrical coil means other than the first means and the way in which they are connected in circuit with the turns of the first electrical coil means, especially advantageous for multi-speed motors having the six or more salient poles where coil-accommodating space is limited.

The subject matter which I regard as my invention is particularly pointed out and distinctly claimed in the concluding portion of this specification. My invention, itself, however, both as to its organization and method of operation, together with further objections and advantages thereof may best be understood by reference to the following description taken in connection with the accompanying drawing:

In the drawing:

FIGURE 1 is an end elevation view, partially schematic, of stator and rotor members incorporated in a single phase shaded pole induction electric motor, with the stator including the preferred embodiment of my improved winding arrangement and circuitry of this invention and with the motor being adapted to operate selectively at three different speeds;

FIGURE 2 is a schematic winding diagram of the main field winding arrangement for the stator member of FIGURE 1, with the arrangement including switch means for selectively providing the three different speeds of operation; and FIGURE 3 is a schematic winding diagram of the main field windings carried by the stator member illustrated in FIGURE 1, showing a modified connection for that seen in FIG. 2 to provide selectively three other speeds of operation.

Turning now to the drawing in more detail for purposes of explanation and disclosure, the preferred form of the present invention is illustrated in connected with an alternating current single phase shaded pole electric motor capabale of selected operation at three different speeds. More specifically and by way of example, the illustrated motor includes a stator member, identified generally by reference numeral 11 in FIGURE 1, having a conventionally laminated magnetic core fabricated from a predetermined plurality of laminations, held together in stacked face to face relation by several key and groove arrangements 12 located at the periphery of the core. The laminations may be stamped or otherwise severed from suitable magnetic sheet material, such as relatively thin iron or steel stock, in the usual way to provide the desired core configuration which, as shown, has a generally annular yoke section 13 and six integral salient pole sections 14 projecting radially inward from the yoke section. Each pole section has a dimensionally reduced neck portion 15 adjacent the yoke section and terminates at its inner end in an enlarged polar face 16 formed with an arcuate tip 17 on its innermost edge. The six pole sections are equally and angularly spaced apart such that tips 17 together define a rotor receiving bore while the axial walls of adjacent pole sections, other than at the rotor bore, along with the inner wall 18 of the yoke section, form a plurality of winding accommodating slots 19 which correspond in number to the pole sections.

Still referring to FIG. 1, each pole section is provided with a slot 21 extending inwardly from its pole face spaced slightly from the edge pointing in the direction of rotation for the rotor member. A suitable shading coil or ring 22 is furnished with a side in the slot and surrounds that edge of the pole face to create the required lagging magnetic field furnished primarily for starting purposes. Standard flat copper bar stock may be used to fabricate coils 22.

With respect to the rotor member, designated by numeral 23 in FIGURE 1, it may be of conventional construction and merely for purposes of disclosing the present invention, includes a magnetic core built from a stacked plurality of laminations punched from relatively thin magnetic sheet material which are firmly mounted on shaft 24. Rotor member 23 is shown as having a standard die cast squirrel cage winding of non-magnetic material, such as aluminum, with a number of angularly spaced conductors 26 extending axially through the core which are electrically joined together at each end of the core by the usual short circuited end rings (not shown).

The winding arrangement shown in FIGURES 1 and 2 for the illustrated stator member 11 includes a first main field winding 30 of the concentrated type having six coils 31–36 inclusive, one coil being carried by each of the six salient poles at their neck portions 14 with the coil sides disposed in the slots 19 next to wall 18 of the yoke section. A second main winding 40, formed by six coils 41–46 inclusive, has termination 47 serially connected to termination 38 of the first winding 30 and is also carried by the salient pole sections such that a single coil of winding 40 is positioned on each of the six pole sections adjacent the rotor bore. As best seen in FIGURE 1 and indicated by the arrows, the coils of both windings are arranged on the pole sections to conduct current in an opposed direction on adjacent pole sections with a pair of coils on the same pole section being adapted to conduct current in the same direction.

In the preferred embodiment, the coils of winding 30 are each formed by a preselected number of turns wound of insulated, non-magnetic and electrically conducting material, such as aluminum, having a resistivity higher in value than that for winding 40 which may be fabricated, by way of example, from commercially available enameled copper wire. In order to derive the maximum benefits of my invention, the coil turns for winding 30 are preferably fewer in number than those for the coils of winding 40 carried by the same salient pole sections. With this arrangement, as will become more apparent from the following discussion, a large volume of the lower cost conducting material; e.g., aluminum, may satisfactorily be utilized for winding 30 while the turns forming the coils of winding 40, fabricated of material having a lower resistivity, or conversely a higher conductivity, than that of winding 30 both as to number per pole section and total number of coils, may be easily selected to furnish the individual operating speeds for the motor without unduly affecting the motor output.

FIGURE 2 schematically reveals the manner in which windings 30 and 40 are connected in circuit relation for achieving selective operation of the motor at any one of three different running speeds. More specifically, wire termination 37 of the aluminum main winding 30 is connected to one side of an alternating current or AC power source 50 through line conductor 51. All of the coils of winding 30 are serially connected to preselected coils of winding 40 through electrically joined together winding terminations 38, 47 respectively of windings 30, 40 and through a manually actuating speed selector switch, generally denoted by numeral 60, which is connected to the other side of the AC power source 50 through line conductor 52. Switch 60 is of conventional construction and includes three stationary contact poles 61, 62, and 63, with a single movable contact arm 64 making connection between any one contact pole and line conductor 52 to energize the winding in a manner now explained in detail for achieving three speed operation.

In order to obtain the highest running speed for the motor without deleteriously affecting the motor output, all of the coils of main winding 3, that is, coils 31 through 36 inclusive, are energized in series with coils 41 and 42 of the second main winding 40 through line conductors 51 and 53. The latter conductor is, in turn, tapped between coils 43 and 44 at the one end and connected at the other end to contact pole 61, the high speed pole of the switch. Thus, when a movable switch arm 64 is in the position shown by the solid lines and denoted by letter A in FIGURE 2, that is, closing the circuit between conductors 52 and 53, the six coils of winding 30 and coils 41 and 42 of winding 40 will be concurrently in series. As revealed by the arrows in FIGURE 1, when winding 30 energizes, current is conducted through its coils in an opposed direction for adjacent pole sections and coils 41, 42 of winding 40 carry current in the same direction as coils 31, 32 on the same pole sections to provide the highest running speed for the shaded pole motor. Further, as will be seen more clearly below in the exemplification, coils 43–46 of winding 40 are in open circuit and are not excited at this time.

A second and lower running speed is achieved by tapping between coils 44 and 45 and stationary contact pole 62 with conductor 54 and moving arm 64 to the broken line position designated by letter B. With arm 64 in position B, once again all of the coils of winding 30 are excited and this time, coils 41–44 inclusive of winding 40 are in closed series circuit with them to produce an intermediate speed for the exemplification. The lowest or third speed for the motor is obtained by serially energizing all twelve coils of windings 30, 40. Conductor 55 connects termination 48 of winding 40 to switch pole 63 and with switch arm placed in position C, both windings will be excited such that the current flow through the pair of coils on any given pole section (e.g., coils 31, 41; 32, 42) provide an additive magnetic relation for the coil turns at that polar location. Consequently, multi-speed operation is readily and simply attained by the present invention for shaded pole motors, in an economical way even for those motors having six or more salient poles where total slot space for accommodating main field windings is quite limited.

The following example is given in order to illustrate more clearly how one form of the present invention, as described above, has been satisfactorily carried out in actual practice. Several substantially identical three-speed single phase fractional horsepower, alternating current, shaded pole induction motors were constructed with stator members having a core built generally in accordance with the configuration shown in FIGURE 1. This core had the following nominal dimensions:

| | Inches |
|---|---|
| Axial stack length | 0.75 |
| Outside core diameter | 4.74 |
| Bore diameter | 2.65 |
| Minimum neck portion width | 0.63 |
| Distance between opposing axial walls of slots 19 | 4.16 |
| Distance between adjacent pole face tips | 0.128 |

The motors were each rated at 1/20 HP and used enameled aluminum wire having an overall diameter of .0285 in. for winding 30. Each of the six coils were defined by 120 turns. With respect to winding 40, it was composed of commercially available enameled copper wire having a diameter of 0.0159 in., with 172 turns per coil for each of its six coils. The aluminum winding had a total resistance of approximately 5.25 ohms while the copper winding included a total resistance in the neighborhood of 17.3 ohms. The rotor 23 of the motor incorporated forty-five equally spaced apart slots, having the contour shown in FIGURE 1, and a cast aluminum squirrel-cage secondary winding.

The following operating results are representative for the example motors outlined above. Under operating conditions, with the winding coils selectively energized in the manner already described in connection with the illustrated three-speed motor of FIGURES 1 and 2, running speeds of approximately 1,000, 800, and 700 r.p.m. were achieved. At these speeds, outputs of 37, 20, and 11 watts were respectively realized or produced and the motors performed quite satisfactorily.

FIGURE 3 is a schematic winding diagram depicting a modified connection for winding 40 which may be used to provide at least two speeds of operation differing from those furnished by the connection of FIGURE 2. Like parts are illustrated in FIGURE 3 by like identifications as those employed in FIGURES 1 and 2. The winding arrangement is essentially the same as that described for FIGURE 2, except that for high speed, only a single coil, coil 41, of winding 40 is energized in series with the six coils of winding 30 and provides a slightly higher speed of operation than the high speed connection of FIGURE 2. To this end, as shown in FIGURE 3, conductor 56, tapped between coils 41, 42 connects coil 41 to switch pole 61. A slightly lower intermediate speed for the arrangement of FIGURE 3 is furnished than its counterpart in FIGURE 2 by energizing five of the six coils of winding 40 together with all the coils of winding 30. Conductor 57, attached at coils 45, 46 and at switch pole 62, may be used for this purpose. The lowest speed for the arrangements of FIGURES 2 and 3 are identical.

It will be appreciated from the foregoing that the present invention provides an improved multi-speed single phase shaded pole induction motor which is capable of satisfactory operation at two or more speeds and may incorporate low cost aluminum wire for one of the main windings even for those motors having six or more salient pole sections. In addition, even though a second main winding is incorporated in the motor and a differing number of coils are selectively energized with the aluminum winding, the main windings may be conveniently wound in place on the pole sections by well-known methods and coil winding machines presently in use today.

It should be apparent that while I have described the present embodiments as applied to a shaded pole motor having a stator incorporating six salient pole sections, the principles enunciated above are equally applicable to other two or more speed multi-pole arrangements. Consequently, while I have shown and described what is considered to be the preferred embodiments of my invention in accordance with the patent statutes, it will be obvious to those skilled in the art that changes and modifications may be made in the disclosed structure without departing from my invention, and it is, therefore, aimed in the appended claims to cover all such changes and modifications as fall within the true spirit and scope of my invention.

What I claim as new and desire to secure by Letters Patent of the United States is:

1. In a single phase alternating current multi-speed shaded pole induction motor, a stator member comprising a number of angularly spaced apart salient pole sections; a first electrical coil means formed of electrically conductive material having a plurality of turns carried by at least some of the salient pole sections; a second electrical coil means formed of electrically conductive material having a plurality of turns carried on at least one of the same salient pole sections accommodating turns of the first electrical coil means; and a third electrical coil means formed of electrically conductive material having a plurality of turns carried by at least one salient pole section other than the at least one salient pole section accommodating turns of said second electrical coil means; said first and second electrical coil means being selectively connected in circuit for concurrent energization to produce a highest speed of operation for the motor under running conditions; and said first second and third coil means being selectively connected in circuit for concurrent energization to produce a second speed of operation lower than the highest speed of operation.

2. In a single phase alternating current multi-speed shaded pole induction motor; a stator member comprising a magnetic core with a yoke section and a plurality of angularly spaced apart salient pole sections projecting inwardly from said yoke section to define a rotor receiving bore; a first main field winding formed of aluminum conductor material having a preselected number of turns carried by each salient pole section; a second main winding of non-magnetic electrically conductive material having a resistivity lower than that for aluminum forming a coil on at least some of said salient pole sections, with said second main winding being serially connected to said first winding; said first main winding and at least one but not all of the coils of said second main winding being concurrently and selectively energized to furnish a high running speed of motor operation, said first main winding and coils of said second main winding in excess of those energized to obtain the first running speed for operating the motor at a second running speed.

3. In a single phase alternating current three-speed shaded pole induction motor; a stator member comprising a magnetic core with a yoke section and at least six angularly spaced apart salient pole sections projecting inwardly from said yoke section to define a rotor receiving bore; a first main field winding formed of aluminum conductor material having a preselected number of turns carried by each salient pole section next to said yoke section; a second main winding of non-magnetic electrically conductive material having a resistivity lower than that for aluminum forming a coil on each salient pole section adjacent said bore, said second main winding being serially connected to said first main winding; said first main winding and at least one but not all of the coils of said second main winding being selectively connected for energization to furnish a first running speed of motor operation, said first main winding and coils in excess of one but not all of the second main winding coils being selectively connected for energization to provide a second running speed of motor operation, and said first main winding and coils of said second main winding in excess of those energized to obtain the second running speed being selectively connected for energization to operate the motor at a third running speed.

4. The stator member set forth in claim 1 in which a fourth electrical coil means formed of electrically conductive material has a plurality of turns carried by preselected salient pole sections other than those having electrically conductive turns of said second and third coil means; and all of said electrical coil means being connected in circuit for selective concurrent energization to produce a third speed of operation under running conditions lower than either of the highest and second speeds of the motor.

5. The stator member set forth in claim 1 in which the resistivity for the electrically conductive material of said first coil means differs from that for said second and of said third coil means.

6. The stator member set forth in claim 5 in which the resistivity for the electrically conductive material of said first coil means is higher than that for the turns of said second and third coil means, and the turns on each salient pole section for said first coil means are less in number than the turns on each salient pole section of either said second or said third coil means.

References Cited
UNITED STATES PATENTS

| | | | |
|---|---|---|---|
| 2,266,088 | 12/1941 | Shea | 318—225 |
| 2,508,143 | 5/1950 | Burdett | 318—225 |
| 2,570,894 | 10/1951 | Willsey | 318—225 X |
| 2,728,038 | 12/1955 | Koch | 318—225 X |

ORIS L. RADER, *Primary Examiner.*

G. Z. RUBINSON, *Assistant Examiner.*